United States Patent [19]
Beccaris

[11] Patent Number: 5,123,511
[45] Date of Patent: Jun. 23, 1992

[54] CLUTCH HAVING A PLURALITY OF FRICTION DISCS CARRIED BY A HUB, ESPECIALLY FOR MOTOR VEHICLES

[75] Inventor: Carlo Beccaris, Santena, Italy
[73] Assignee: Valeo, Paris Cedex, France
[21] Appl. No.: 708,860
[22] Filed: May 31, 1991
[30] Foreign Application Priority Data
May 31, 1990 [FR] France ................... 90 06765
[51] Int. Cl.5 .................. F16D 13/44; B60K 17/02
[52] U.S. Cl. ..................... 192/70.13; 192/70.16
[58] Field of Search ........... 192/70.16, 70.19, 70.2, 192/70.13, 70.3, 110 S, 109 R, 70.27, 109 A, 109 B

[56] References Cited
U.S. PATENT DOCUMENTS

| 1,526,203 | 2/1925 | Buisson | 192/70.27 X |
| 1,727,142 | 9/1929 | Vincent | 192/110 R |
| 2,038,016 | 4/1936 | Wemp | 192/70.27 X |
| 3,417,844 | 12/1968 | Zeidler | 192/70.3 |
| 3,666,062 | 5/1972 | Riese | 192/70.2 X |
| 3,765,514 | 10/1973 | Harrison | 192/70.2 X |
| 4,466,524 | 8/1984 | Lane | 192/70.25 |

FOREIGN PATENT DOCUMENTS 1192824 10/1959 France .
2331714 6/1977 France .
2623862 6/1989 France .

Primary Examiner—Rodney H. Bonck
Attorney, Agent, or Firm—Longacre & White

[57] ABSTRACT

A clutch includes a reaction plate, a cover plate, a pressure plate and, arranged between the pressure plate and the reaction plate, at least two friction discs, together with at least one intermediate disc which is interposed between the two friction discs, the latter being mounted for rotation with a hub of the clutch. The hub, the friction discs and the intermediate disc are assembled together, to form a unit which can readily be handled and transported, due to the presence of at least one shoulder carried by each of the axial ends of the hub.

7 Claims, 5 Drawing Sheets

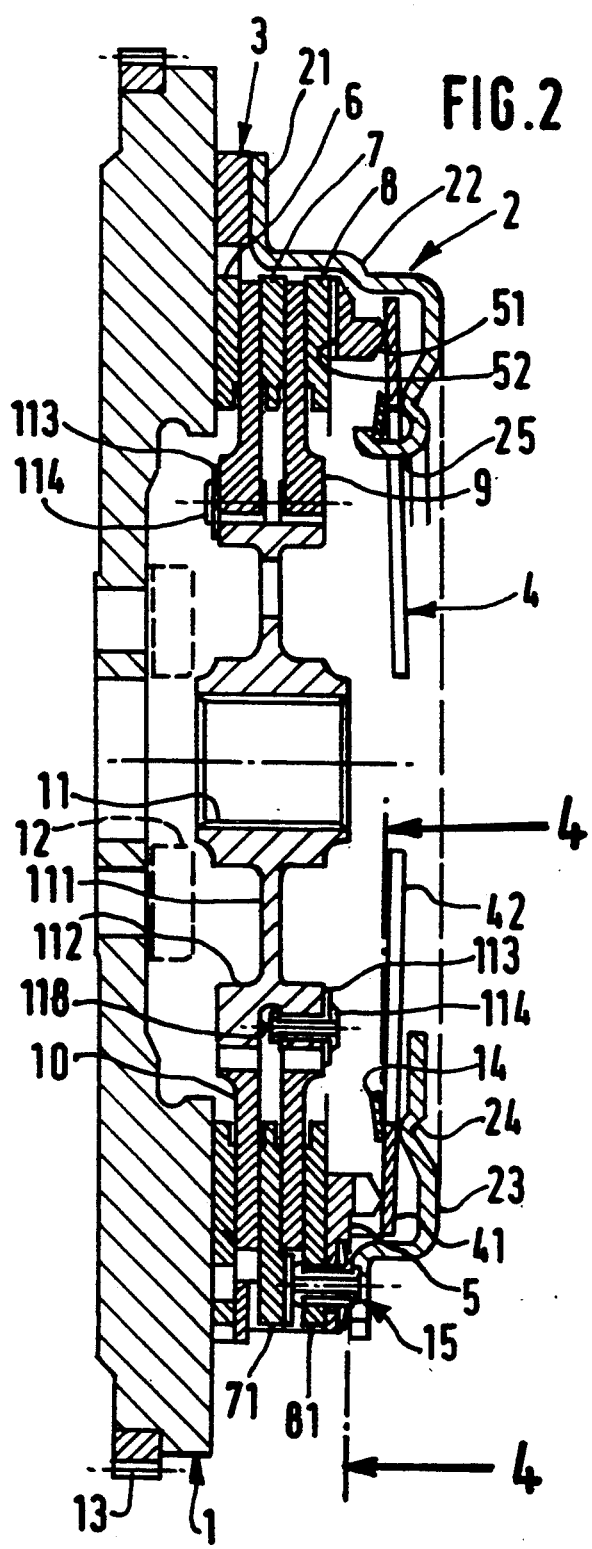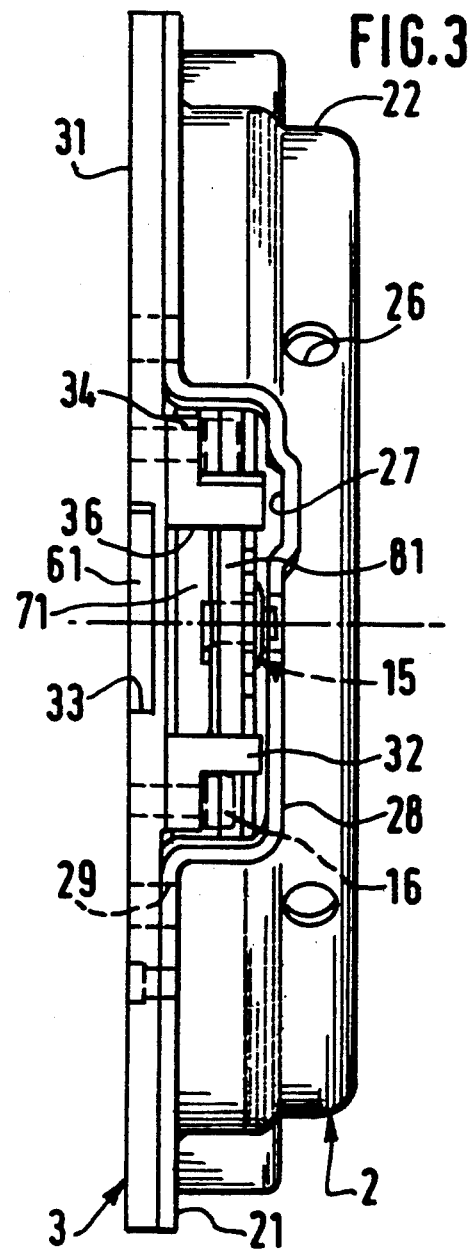

CLUTCH HAVING A PLURALITY OF FRICTION DISCS CARRIED BY A HUB, ESPECIALLY FOR MOTOR VEHICLES

FIELD OF THE INVENTION

This invention relates to clutches of the kind having a plurality of friction discs, especially for motor vehicles. More particularly, the field of the invention is that of clutches of the above kind comprising: a reaction plate; a cover plate which is secured to the reaction plate; a pressure plate which is fixed with respect to the cover plate to the extent that it rotates with the latter, but which is mounted for axial movement with respect to the cover plate; and, arranged between the pressure plate and the reaction plate, at least two friction discs which are mounted for rotation with a hub, together with at least one intermediate disc which is mounted for rotation with the reaction plate and with the cover plate, the intermediate disc or discs being interposed between the friction discs.

BACKGROUND OF THE INVENTION

A clutch of the above kind is described in the specification of French published patent application No. FR 2 623 862A. In that specification, the intermediate discs are coupled with the reaction plate for rotation with the latter, the intermediate discs being movable axially by virtue of a hub having a plurality of projections which cooperate with openings formed in the friction discs. These projections are carried by a wheel or plate which is interposed between the two friction discs.

Such an arrangement ensures that the friction discs will be properly released during a declutching operation; it does however have disadvantages as far as the assembly operation is concerned, because the friction discs are separate from the hub.

DISCUSSION OF THE INVENTION

An object of the present invention is to overcome the above drawbacks, and to provide a new arrangement in which fitting of the friction discs and the hub in the clutch is facilitated.

In accordance with the invention, a clutch of the kind having a plurality of friction discs, comprising: a reaction plate; a cover plate fixed with respect to the reaction plate; a pressure plate mounted for rotation with the cover plate and for axial movement with respect to the latter; at least two friction discs disposed between the pressure plate and the reaction plate and mounted for rotation with a hub; at least one intermediate disc disposed between the pressure plate and the reaction plate and mounted for rotation with the reaction plate and with the cover plate, and being interposed between the two friction discs, is characterised in that the hub forms a unitary assembly, which can be readily and transported, with the friction discs and the intermediate disc or discs, by virtue of at least one shoulder carried by each of the axial ends of the hub.

Final fitting of the clutch is simplified by the invention, and during fitting there is no danger of the hub being ejected from the shaft on which the hub is mounted. In this connection, it is the friction discs that determine the longitudinal position of the hub.

In one embodiment of the invention, the hub has a central portion which carries a fork having two branches which are spaced apart from each other, being separated by a groove. The branches of the fork are provided with grooves separated by projections. This arrangement enables a hollow rivet (of the "pop rivet" type) to be inserted in the groove or gap which separates the branches of the fork from each other. This rivet extends through the above mentioned projection and has one end upset in contact with the ring which defines the shoulder which is provided in accordance with the invention.

In addition, machining of the hub is simplified, with the grooves delimited by the projections being easier to form than are the projections in the prior art arrangment described above. These latter grooves are preferably aligned from one branch of the fork to the other, so that machining can be carried out straight through them. Another rivet can of course be fitted in the other branch in order to carry a further ring and to define the second shoulder, if desired.

This arrangement gives a hub which is both economical in cost and which has a reduced inertia.

In a modification, a bolt may be fitted so as to extend from one side of the fork of the hub to the other, so as to hold, at each end, rings which define the shoulders according to the invention.

The unitary assembly in accordance with the invention is preferably mounted in an intermediate driving crown member which is fixed to the reaction plate. All of these arrangements facilitate the final fitting of the clutch. The description which follows illustrates the invention in detail, by way of example only and with reference to the accompanying drawings.

BRIEF DESCRIPTION OF THE DRAWINGS

FIG. 2 is a view in cross section taken on the line 2—2 in FIG. 1.

FIG. 3 is a view as seen in the direction of the arrow 3 in FIG. 1.

DESCRIPTION OF PREFERRED EMBODIMENTS OF THE INVENTION

Figure 1:
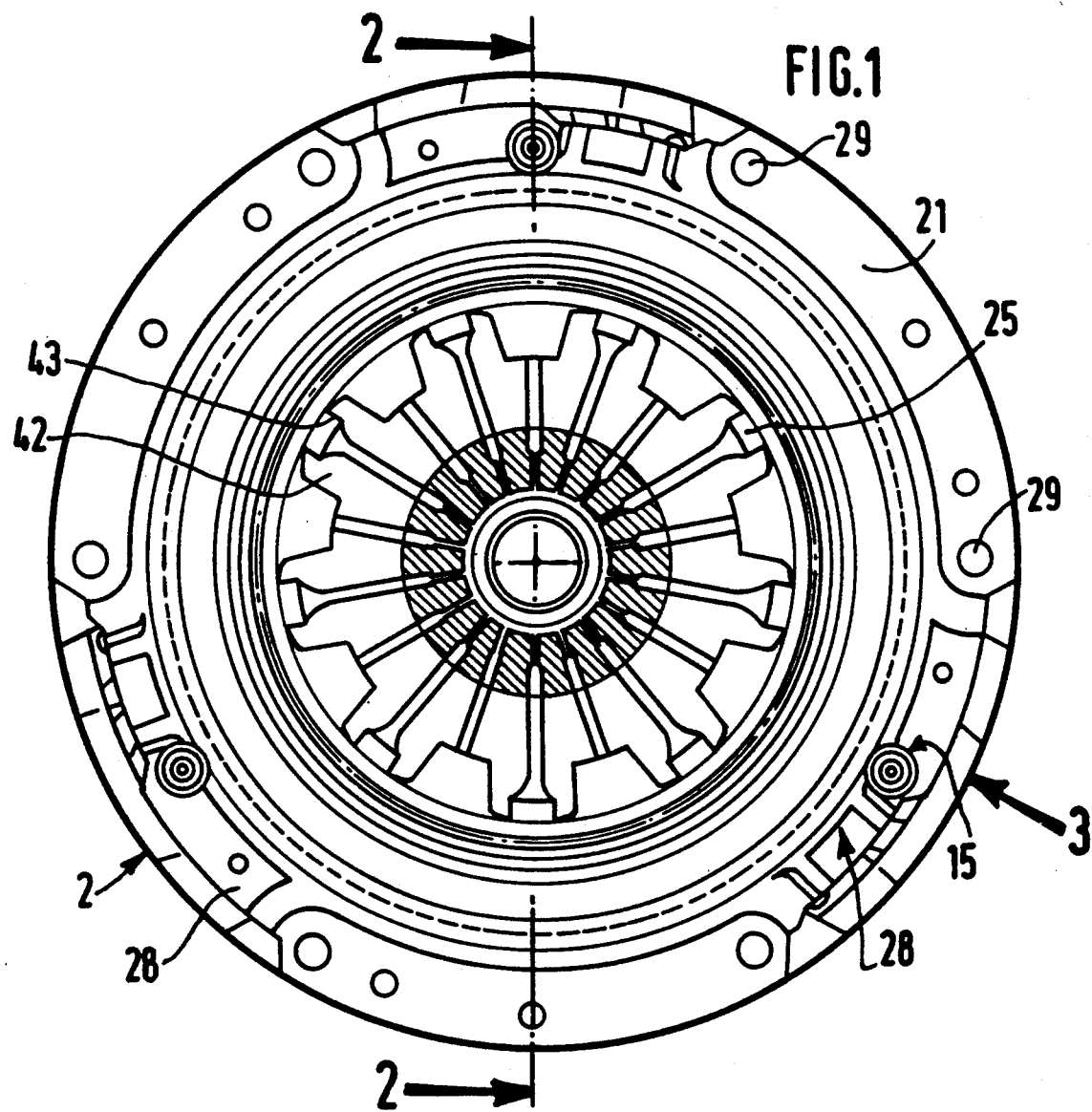
FIG. 1 is a view in elevation of the clutch in accordance with the invention.

The clutch which will be described below is a clutch of the kind having two friction discs, particularly suitable for fast motor vehicles such as sports or racing cars. It comprises a plurality of annular members, all coaxial with each other, namely a reaction plate 1, a cover plate 2, an intermediate crown 3, a diaphragm 4, intermediate discs 6, 7 and 8, friction discs 9 and 10, and a hub 11. The reaction plate 1 is also the engine flywheel, and is fastened to the crankshaft (not shown) of the engine of the vehicle, in this particular example by means of bolts or studs 12 which are shown diagrammatically.

The cover plate 2 is generally in the form of a hollow dish, and has an outwardly projecting radial fastening flange 21 which is joined to an annular skirt portion 22 oriented axially. The skirt portion 22 is joined to a base portion 23 which extends generally radially and towards the axis of the assembly. The base portion 23 has a projecting bead 24, and is also provided with assembly tabs 25. It has a central opening. The bead 24 acts as a primary stop element for the diaphragm 4. More precisely, the diaphragm 4 has a peripheral portion 41 defining a Belleville ring, and a central portion which is divided into radial fingers 42 separated by gaps (see FIG. 1), together with apertures 43 adjacent to the roots of the fingers 42, with the gaps between the fingers opening into the apertures 43.

The Belleville ring 41 bears internally on the annular bead 24, while externally the ring 41 bears on an annular lip 51 of the pressure plate 5. In this example, the annular lip 51 is divided into separate sections. The assembly tabs 25 extend through the apertures 43 of the diaphragm, being then bent radially outwards in the direction away from the axis of the assembly, so that they are hook-shaped. The purpose of the tabs 25 is to locate in position a sealing ring 14. This ring 14 constitutes a secondary engagement element for the Belleville ring 41, facing the bead 24.

In this way, the diaphragm 4 is mounted for tilting movement on the cover plate 2, and bears on the latter so as to urge the pressure plate 5 towards the reaction plate 1, thereby enabling the discs 6 to 10 to be gripped. More precisely, the intermediate disc 6, the friction disc 10, the intermediate disc 7, the friction disc 9, and the intermediate disc 8 are interposed in axial succession, in the order mentioned, between the reaction plate 1 and the pressure plate 5.

The discs 6, 7 and 8, which in this example are driving discs, are secured to the reaction plate 1 and the cover plate 2, for rotation with them, through the crown 3 which thus acts as an intermediate drive member. The discs 9 and 10, which in this example are driven discs, being arranged alternately with the intermediate discs 6, 7 and 8, are mounted so as to be rotatable with the hub 11. They are surrounded by the skirt portion 22 of the cover plate 2, by the discs 7 and 8, and by the pressure plate 5.

The crown 3 has means for coupling it in rotation, so as to drive the intermediate discs 7 and 8 while preserving their ability to move in the axial direction. In this example, this rotary coupling means consists of a plurality of axial lugs 32, fixed to the crown 3 (see FIGS. 3 and 6). Each lug 32 defines a mortice 36. The lugs 32 extend axially towards the base portion 23 of the cover plate, the mortices 36 being open towards the base portion and closed by a ring 31 of the crown 3. A plurality of tenons 71, 81 are arranged to cooperate with the mortices 36. These tenons 71 and 81 are carried by, and project radially from, the respective intermediate discs 7 and 8, see FIG. 6.

The lugs 32 are fixed to the closure ring 31 (and in this example they are integral with it). The ring 31 is inserted axially between the reaction plate 1 and the fastening flange 21 of the cover plate 2. The outer diameter of the closure ring 31 is, in this example, equal to the outer diameter of the fastening flange 21 of the cover plate 2.

Referring to FIG. 3, the cover plate 2 is of a standard type, with its skirt portion 22 being provided with openings 27, each of which is delimited by a radial hood portion 28. The hood portion 28 is joined to the fastening flange 21, and would normally serve for securing tangential tongues which couple the pressure plate to the cover plate for rotation with it. In the present case, however, use is made of the opening 27 for insertion of the axial lugs 32, these lugs being designed and dimensioned accordingly.

Figure 5:
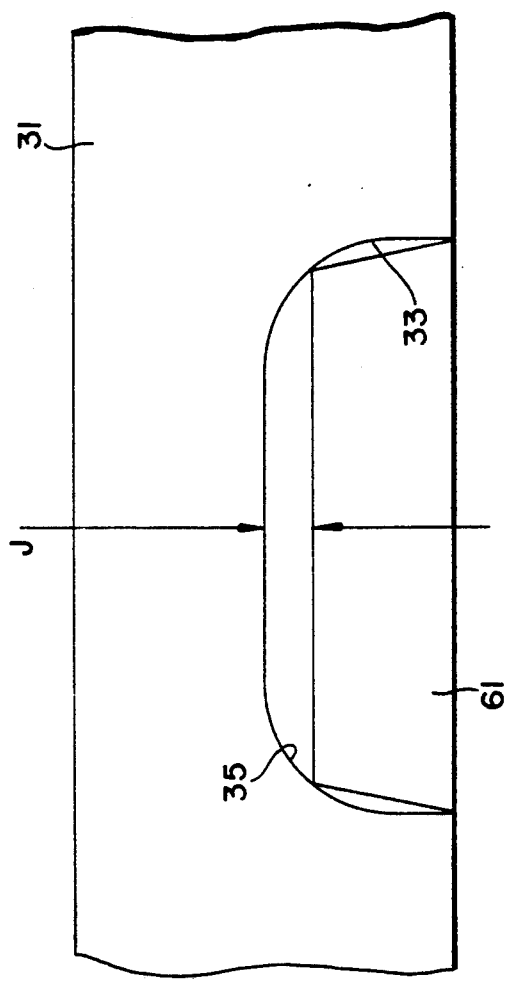
FIG. 5 is a detail view showing the form of the notch formed in the intermediate crown on the clutch.

The intermediate driving member or crown 3 has at least one thrust surface 35 (see FIGS. 5 and 6) which faces towards the reaction plate 1, while the intermediate disc 6 adjacent to the reaction plate 1 has a cooperating reaction surface 61, which engages the thrust surface 35 so as to locate the intermediate disc 6 axially with respect to the reaction plate 1. In this example, the intermediate disc 6 has at least one reaction surface 61 which cooperates with a notch 33 formed in the closure ring 31, on the side of the latter which faces axially towards the reaction plate 1. The thrust surface 35 is formed in the notch 33 itself, while the reaction surface 61 is formed on a projecting tenon of the intermediate disc 6.

It will be noted that in this example, each of the intermediate discs 6, 7 and 8 has three tenons which are spaced apart circumferentially at 120° with respect to each other. It will also be noted that the cover plate 2 has three hood portions 28 and three openings 27. The crown 3 has three axial lugs 32, three mortices 36, and three notches 33.

The outer diameter of the discs 6 to 10 determines the internal diameter of the closure ring 31 and of the lugs 32, according to requirements, but in such a way that, in particular, the discs 7 to 10 are able to penetrate within the circular envelope defined by the lugs 32, while the intermediate disc 6 can penetrate into the interior of the closure ring 31.

In this example the closure ring 31 is of metal. The notches 33 may be formed by a milling operation, and may extend through the whole radial height of the closure ring 31.

The number of tenons 81, mortices 36, notches 33 and hood portions 28 depends on the requirements of the application to which the clutch is to be put, and on the size of the cover plate 2. The same is true of securing means indicated at 15 in FIGS. 3 and 4. The notches 33 are here arranged at the level of (i.e. in circumferential alignment with) the lugs 32, which have two lateral shouldered portions 34 to support the heads of screws 16 securing the crown 3 to the reaction plate 1. The mechanical strength of the crown 3 is thus able to be made satisfactory despite the presence of the notches 33. In addition, because of the screws 16 and notches 33, it is possible to build a sub-assembly consisting of the crown 3, the intermediate disc 6 and the reaction plate 1, thus enabling the intermediate disc 6 to be inspected.

The cover plate 2 is also secured to the reaction plate 1 by means of screws (not shown), which extend through holes 29 in the fastening flange 21 of the cover plate, and through corresponding holes formed in the closure ring 31 (see FIG. 3).

The notch 33 has a base portion which is joined through rounded portions 35 to two axially disposed side flanks of the notch, and is generally U-shaped. The projecting tenon 61 has a circumferential width, subject to fitting clearances, equal to the distance separating the side flanks of the notch 33. Its thickness is less than the depth of the notch 33, so that a clearance J (FIG. 5) exists between the base of the notch 33 and the tenon 61. The edges of the tenon 61 constitute stop or reaction surfaces. They are designed so as to cooperate with the rounded portions 35 of the thrust surface, these rounded portions constituting the actual working part of the latter.

The face of the intermediate disc 6 and the face of the intermediate crown 3 that face towards the reaction plate 1 lie in the same plane. Thus, during assembly by thightening the screws 16 into the reaction plate 1, the crown 3 is offered up to the reaction plate 1 so that the tenon 61 comes to bear on the rounded stop surfaces 35. In this way, the intermediate disc 6 is located axially without any play, but with coupling in rotation. Since the clutch is intended for use in a fast motor vehicle, the intermediate discs 6, 7 and 8 in this example contain carbon, as do the friction discs 9 and 10. The latter are coupled to the hub 11 through teeth 91 and 101 (see FIGS. 6 and 4), which engage in complementary axial grooves 117 formed in the hub 11.

The hub 11, together with the friction discs 9 and 10 and the intermediate disc 7, form a unitary assembly which is readily handled and transported, by virtue of at least one shoulder 113 which is carried by each of the axial ends of the hub 11. More precisely, the hub 11 has an integral central portion with a splined internal bore, for mounting it on the input shaft (not shown) of the gearbox of the vehicle, for rotation with the input shaft. This central portion carries a radial web 111, which itself carries a fork 112 having two branches spaced apart from each other and extending radially outwards. The branches of the fork 112 are separated by a groove or gap 118. The width of each branch of the fork is greater than the thickness of the thickened inner periphery of the friction disc 10 or 9 concerned. The branches of the fork 112 are provided with grooves 117, with which the teeth 91 and 101 of the friction discs 9 and 10 respectively are arranged to cooperate. In order to facilitate machining, the grooves 117 are aligned axially from one branch of the fork to the other. Machining is then carried out by axial traverse of the fork 112.

It will be noted that in this example, the teeth 91 and 101 are trapezoidal in shape, and that the grooves 117 are of the same shape. The grooves 117 are bounded by projections 116 (which are here radial), while the teeth 91 and 101 are bounded respectively by recesses 92 and 102. Each of four of the projections 116 accommodates one of four rivets 114, for which purpose they have apertures through which the rivets 114 can pass. The head of each rivet 114 bears on the surface of the branch that faces towards the other branch of the fork. The rivet head thus lies in the groove 118. Besides accommodating the rivet heads, the groove 118 also enables the inertia of the hub 11 to be reduced. The rivets 114 are hollow, and extend through the corresponding branch of the fork 112. The other end of each rivet is upset so as to retain a ring 113 in contact with the corresponding axial end face of the fork 112. It is this ring 113 that defines the shoulder in accordance with the invention, being axially located between the upset end of the rivet 114 and the axial end face of the corresponding branch of the fork 112 of the hub 11. Thus the shoulder defined by the ring 113 is local.

In this instance, each branch of the fork 112 is provided with two of the rings 113 and two rivets 114. The rings 113 define shoulders which are adapted to cooperate respectively with the disc 9 and the disc 10.

Due to the above arrangement, the hub 11 is located axially by the friction discs 9 and 10, so that during the assembly operation, while the input shaft of the gearbox is being inserted in the hub, there is no danger of the hub being ejected.

In addition, the rings 113 enable the movement of the friction discs 9 and 10 to be limited during a declutching operation. This enables the discs 9 and 10 to be displaced by a satisfactory amount. Furthermore, it also enables a sub-assembly, readily able to be handled and transported, to be built. This sub-assembly comprises the friction discs 9, 10 and the intermediate disc 7. All of this simplifies the clutch assembly operation.

The securing means 15 mentioned earlier comprise axial securing means having a resilient gripping action, and are mounted between the pressure plate 5 and its associated intermediate disc 8. The axial securing means comprise at least one axial fastening device 15 inserted in a hood portion 28.

In this example, the intermediate disc 8 adjacent to the pressure plate 5 is joined to the latter through at least one of these fastening devices 15, the latter having the resilient gripping effect and being fitted in a tenon 81. One fastening device 15 is associated with each tenon 81 as, can be seen in FIG. 1.

Figure 7:
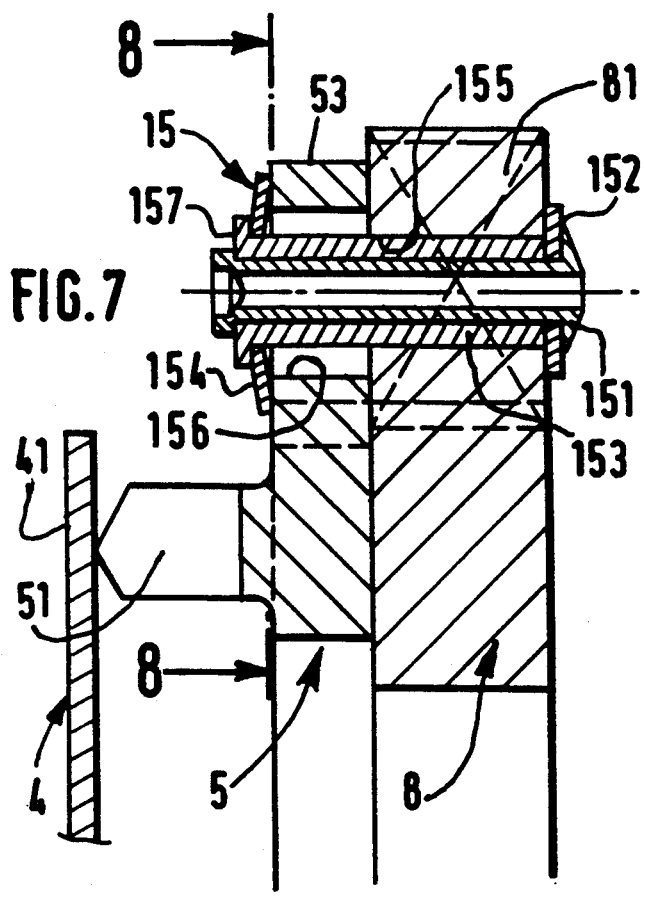
FIG. 7 is a view in cross section showing the securing means whereby the pressure plate is attached to its associated intermediate disc.
Figure 8:
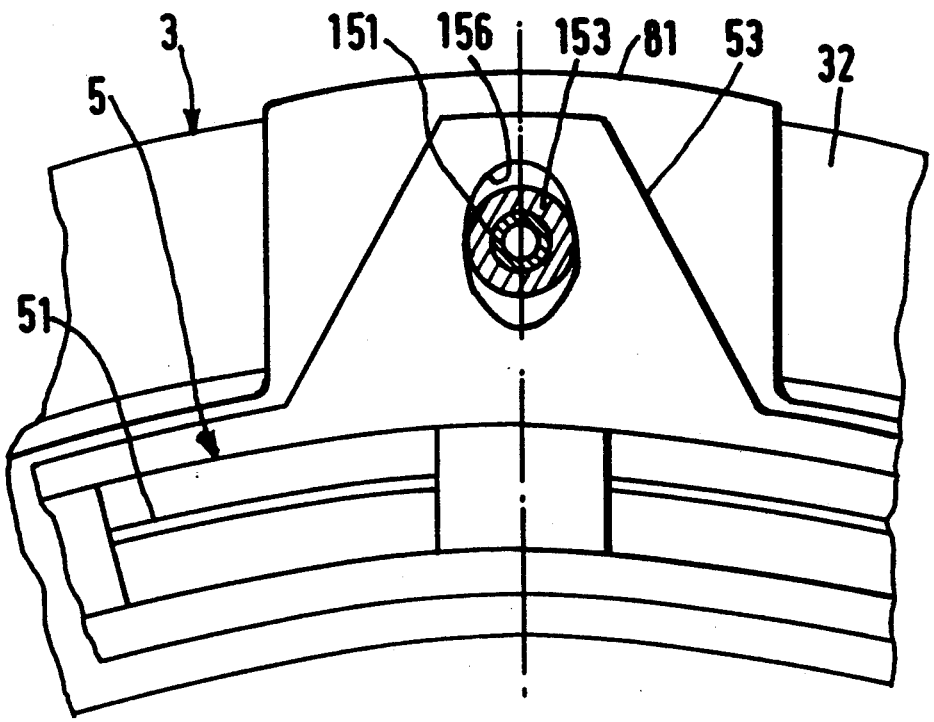
FIG. 8 is a partial view, seen in cross section on the line 8—8 in FIG. 7, with the intermediate crown included.

Referring to FIGS. 7 and 8, the pressure plate 5 has three ears 53, trapezoidal in shape and projecting radially outwardly from the outer periphery of the pressure plate. These ears 53 lie in line with the corresponding tenons 81 of the intermediate disc 8, as can be seen best in FIG. 8.

As is best seen in FIGS. 7 and 8, each of the three fastening devices 15 comprises a ring 152 and a tubular rivet 151, which passes through a centering and spacing tube 153 having a shoulder 157 at one of its ends. The tube 153 and the rivet 151 pass through an opening 155 which is formed in the tenon 81, and a hole 156 which is formed through the ear 53. The fastening device 15 also includes an axially acting resilient means 154, which in this example is a Belleville ring. The latter bears, firstly on the face of the ear 53 which is directed towards the diaphragm 4 (and therefore towards the base portion 23 of the cover plate 2), and secondly on the shoulder 157 of the tube 153.

Instead of the Belleville ring 154, this resilient means could instead consist of a coil spring or a corrugated ring, for example of figure-of-eight form.

The other end of the tube 153 is in contact with the ring 152, bearing against the face of the tenon 81 which is directed away from the ear 53, and therefore facing towards the reaction plate 1.

In a modification, in place of the tube 153, a shouldered centering pin may be provided, this centering pin being adhesively secured to the tenon 81. In a further modification, a screw or bolt may be used, fixed to the tenon 81 and having a plain centering portion for cooperating with the hole 156.

The ring 152 is held in position by the upset end of the expandable rivet 151. The head of the latter is shouldered and is in contact with the shouldered end 157 of the tube 153, while the main portion or shank of the rivet 151 passes through the tube 153.

The hole 156 in the ear 53, which in this example is narrower in the circumferential direction than the tenon 81, is oblong in shape, with parallel side edges extending radially and joined to each other through rounded base portions. The axis of symmetry of the hole 156 passes through the centre of rotation of the pressure plate 5, and the tube 153 is in point contact with the side edges of the holes 156. The pressure plate is thus centred with respect to the axis of the assembly, by virtue of the tube 153 cooperating with the contour of the hole 156, together with the tenon 81 which is centred by the axial lugs 32 (FIG. 3). The pressure plate 5 is butted against the intermediate disc 8, which enables the length of the lugs 32 to be reduced.

The tenons 81 are themselves in cooperation with the mortices 36 of the crown 3. Accordingly, the pressure plate 5 is movable axially with respect to the cover plate 2, while being coupled to the latter, for rotation with it, by means of the tenons 81 and tubes 153.

The intermediate disc 8 is made of a carbon based material, while the pressure plate 5 is for example made of aluminium. By virtue of the shouldered tube 153, the resilient means 154 and the hole 156, it becomes possible to absorb any differential thermal expansion or contraction that may arise due to differences in temperature between the intermediate disc 8 and the pressure plate 5.

The dimensions and stiffness of the resilient means 154 are selected with a view to retaining the pressure plate against the intermediate disc 8, without a clearance between them, when the clutch is operating, while still enabling the Belleville ring or other resilient means 154 to yield axially in order to accommodate thermal movement of the pressure plate 5. The length of the shouldered tube 153 is also selected accordingly, in such a way that in its compressed position, the resilient means 154 will exert a sufficiently large thrust to hold the pressure plate 5 and the intermediate disc 8 together without a clearance between them.

This arrangement is of particular advantage in a sports or racing car or other high speed motor vehicle, because the clutch is able to reach high temperatures without any risk of undue deterioration of the friction discs, while at the same time the inertia is low. By virtue of the arrangement described above, the pressure plate 5 is resiliently butted against the intermediate disc 8, without any clearance appearing between them during the retraction of the intermediate disc 8 in the declutching operation. The Belleville ring 154 causes the pressure plate 5 and intermediate disc 8 to be gripped together resiliently. As mentioned above, it is dimensioned accordingly.

It will be noted that the pressure plate 5 has radial channels 52, which are open axially at the level of the intermediate disc 8 and in line with holes 26 (FIG. 3) formed in the skirt portion 22 of the cover plate 2. This provides a ventilation facility for the pressure plate 5, which enables the temperature of the diaphragm 4 to be reduced, so avoiding any undue deterioration in the resilient characteristics of the diaphragm under the effect of heat in operation.

Figure 4:
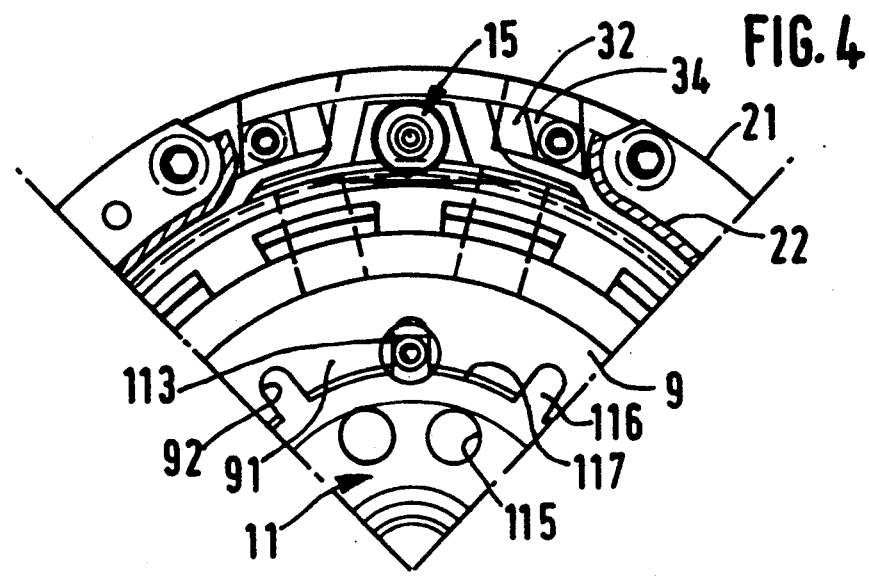
FIG. 4 is a view in cross section, showing part of the clutch, the cross section being taken on the line 4—4 in FIG. 2.

It will also be noted that the radial web 111 of the hub 11 is perforated at 115, FIG. 4, thus reducing the weight of the hub 11 and improving the ventilation of the latter. The hub 11 is inexpensive and may for example be of steel.

Figure 6:
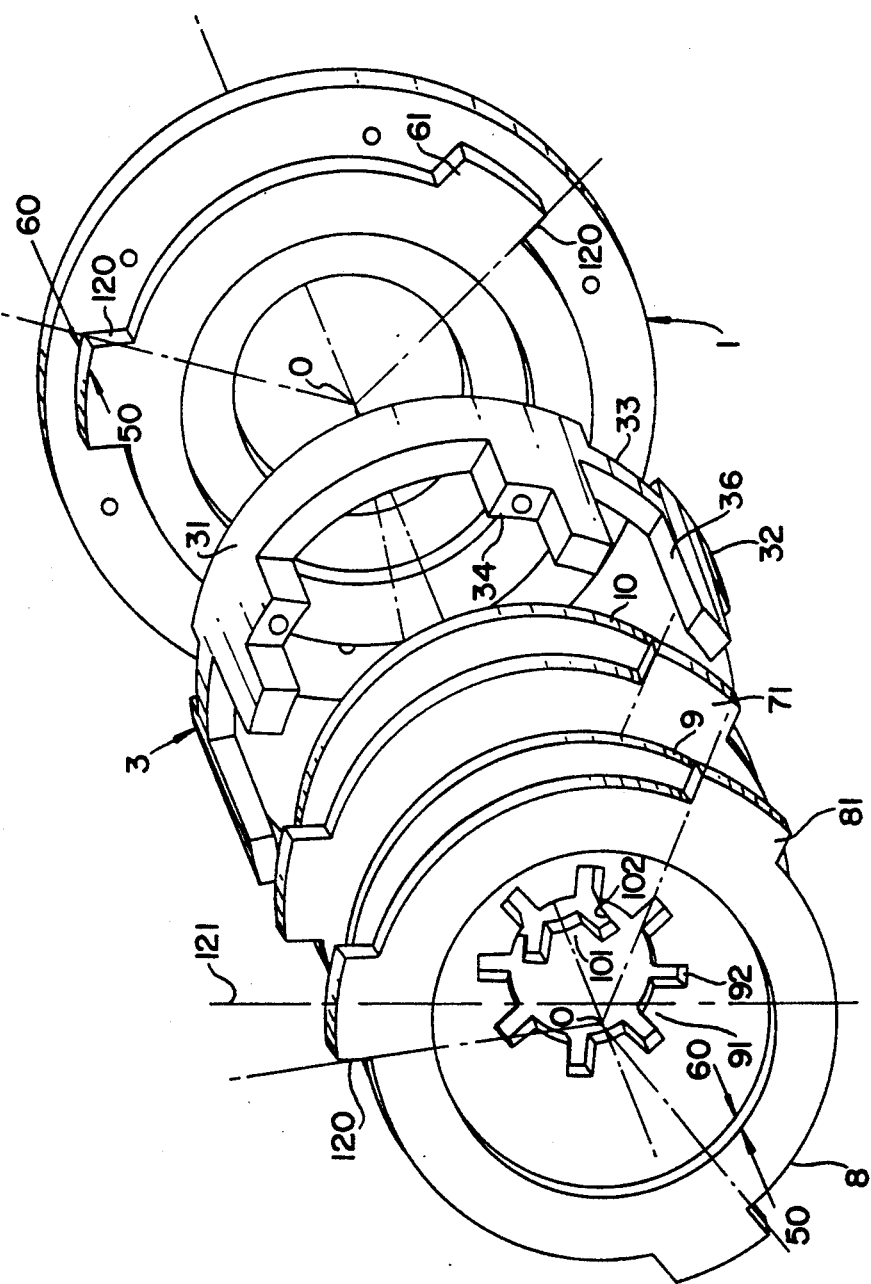
FIG. 6 is a simplified perspective view showing the intermediate discs, the friction discs, the intermediate crown and the reaction plate of the clutch in accordance with the invention.

As can be seen in FIG. 6, one of the sides, or lateral edges, 120 of the tenons 81, 71, 61 of the intermediate discs 8, 7, 6 respectively passes through the centre of rotation O of the intermediate disc concerned. In general terms, the axis of symmetry 121 of each tenon does not pass through the centre of rotation O of the corresponding intermediate disc. This arrangement ensures that during refitting of the discs 6, 7 and 8, the latter cannot be refitted the wrong way round. It will be recalled that in the normal position with the clutch engaged, the diaphragm 4 bears against the bead 24 and on the lip 51 (FIG. 2), so that the pressure plate 5 is urged towards the reaction plate 1 so as to grip the intermediate discs 6, 7 and 8 and the friction discs 9 and 10 between the pressure and reaction plates. In order to disengage the clutch (i.e. to perform the declutching operation), it is merely necessary to apply a thrust by means of a clutch release bearing (not shown) on to the inner end of the fingers 42 of the diaphragm 4, so as to cause the diaphragm to tilt and overcome the axial thrust which the diaphragm exerts on the pressure plate 5.

It will be noted that during declutching, the friction discs 9 and 10 have a sufficient degree of movement, that is to say a gap exists between the discs 6, 7 and 8 and the friction discs 9 and 10. This is due mainly to the retention of the disc 6 in the axial direction (as already described), together with the engagement of the intermediate disc 8 with the pressure plate 5 which is obtained by means of the fastening devices 15. The friction discs 9 and 10 are also able to slide freely due to their mounting on the hub 11.

It will be appreciated that the fitting of the clutch makes use of sub-assemblies. These are: the sub-assembly consisting of the reaction plate 1, intermediate disc 6 and intermediate crown 3; the sub-assembly consisting of the hub 11, the friction discs 9 and 1/ and the intermediate disc 7; the sub-assembly consisting of the pressure plate 5 and intermediate disc 8; and finally a sub-assembly consisting of the cover plate 2 and diaphragm 4. After the crown 3 and intermediate disc 6 have been fitted, it is then only necessary to fit into the mortices 36 the sub-assembly that includes the hub 11, then to fit the pressure plate 5 with its intermediate disc 8, and finally to fit the cover plate 2 with its diaphragm 4.

Figure 9:
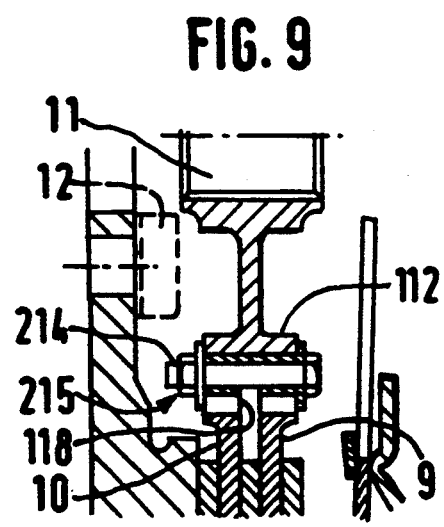
FIG. 9 is a partial view, similar to FIG. 2 but showing part of the hub in a second embodiment of the invention.

The present invention is of course not limited to the embodiments described. In particular (see FIG. 9), the rings 113 may be connected to each other by means of bolts 215 and nuts 214, the bolts 215 passing through the fork 112 from one side of the latter to the other. The rings 113 are interposed firstly between the head of the bolt and one of the end faces (or axial ends) of the fork 112, and secondly between the nut 214 and the other end face (or axial end) of the fork 112. The bolts 215 pass through two projections 116, each associated with one of the two branches of the fork 112. The projections 116 are aligned with each other, as are the grooves 117. This arrangement enables the friction discs to be disassembled after the clutch and hub have been disassembled from each other, so that the friction discs 9 and 10 can be inspected. In a modification, the bolt 215 is replaced by a hollow rivet, similar to the rivet seen in FIG. 2, passing through the fork 112 from one side of the latter to the other. In all cases, the hub 11 is of a simple shape, with the grooves 117 extending across the whole width of the fork 112.

With reference to FIG. 2, it is of course possible to offset the grooves in one of the branches of the fork 112 circumferentially from those of the other branch.

Instead of the member 3, a plurality of spacing blocks may be used. These spacing blocks are then fixed to the cover plate 2 and to the reaction plate 1 in the manner described in the specification of French published patent application No. FR 2 623 862A. Between the intermediate discs that are closest to the reaction plate, these spacing blocks have circumferential extensions for cooperating with the appropriate intermediate disc in order to locate the latter axially.

The axial lugs 32 may comprise projections for cooperating with mortices formed in the discs 7 and 8. In a modification, these lugs comprise dowels or pins carried by the closure ring 31 and each engaging, with sliding movement, in a hole formed in one of a series of lugs formed respectively in the disc 7 and the disc 8.

The clutch may include more than two friction discs, and thus more than three intermediate discs. The pressure plate 5 may cooperate directly with one of the friction discs; in that case the clutch of FIG. 1 will have only two intermediate discs. The clutch may be of the "pull" type.

Finally, the pressure plate may be subjected to the action of engagement means that comprise a component other than a diaphragm. This may for example consist of a hydraulic actuator device of the piston and cylinder type. Alternatively, it may consist of a plurality of coil springs.

What is claimed is:

1. A clutch comprising:
   a reaction plate, a cover plate secured to said reaction plate;
   a pressure plate;
   means securing the pressure plate to the cover plate for rotation with the cover plate and mounting the pressure plate for axial movement with respect to the cover plate;
   a hub coaxial with said pressure and reaction plates, said hub comprising a central portion for coupling to a shaft for rotation therewith and a radially outwardly directed web extending from said central portion, said hub further comprising a fork carried externally by said web, said fork comprising two branches with an axial gap separating the two branches of the fork and spacing them away from each other;
   at least two friction discs including a plurality of teeth which are fixed with respect to each said friction disc, each branch of the fork of the hub being provided with grooves for cooperation with said teeth;
   means mounting the friction discs on the hub for rotation therewith;
   at least one intermediate disc; and
   means mounting the intermediate disc or discs in interposed relationship between the friction discs and securing said intermediate disc or discs with respect to the reaction plate and cover plate for rotation therewith;
   wherein the hub defines axial ends of the hub and has at least one shoulder carried by each axial end of said hub, whereby the hub defines, with the friction discs and said intermediate disc or discs, an assembly which can be handled and transported as a unit.

2. A clutch according to claim 1, wherein the width of each branch is greater than the thickness of the inner periphery of a said friction disc.

3. A clutch according to claim 1, wherein the hub further includes projections defining said grooves.

4. A clutch according to claim 3, further comprising a ring in contact with an outer face of the fork of the hub, and securing members holding said ring in contact with said outer face, said projections of the hub being formed with apertures and said securing members extending through said apertures.

5. A clutch according to claim 4, wherein said securing members comprise rivets, each having a head, with each said rivet head being fitted in the gap between the two branches of the fork.

6. A clutch according to claim 3, further comprising a first ring lying against one axial end of the fork of the hub, a second ring lying against the other axial end of the fork, and securing means comprising a plurality of bolts extending through the fork from one side of the latter to the other, each bolt having a head, the first ring being interposed between the heads of the bolts and the associated said axial end of the fork, and a nut carried by each said bolt, with the second said ring being interposed between said nuts and the said other axial end of the fork.

7. A clutch according to claim 1, wherein said grooves cooperating with said friction disc teeth are axially aligned from one branch of the fork to the other.

* * * * *